United States Patent [19]

Szabo

[11] 3,919,359

[45] Nov. 11, 1975

[54] ALKOXYALKYL PHOSPHONATES

[75] Inventor: Karoly Szabo, Syracuse, N.Y.

[73] Assignee: Exxon Research and Engineering Company, Linden, N.J.

[22] Filed: Apr. 30, 1973

[21] Appl. No.: 356,045

Related U.S. Application Data

[62] Division of Ser. No. 60,773, Aug. 3, 1970, Pat. No. 3,733,379.

[52] U.S. Cl. .............................................. 260/942
[51] Int. Cl.² ............................................. C07F 9/40
[58] Field of Search .................................. 260/942

[56] References Cited
UNITED STATES PATENTS

| | | | |
|---|---|---|---|
| 3,030,264 | 4/1962 | Baker et al. ...................... | 260/942 X |
| 3,396,212 | 8/1968 | Sakai et al. ...................... | 260/942 X |

FOREIGN PATENTS OR APPLICATIONS

| | | | |
|---|---|---|---|
| 413,485 | 12/1966 | Switzerland........................ | 260/942 |

*Primary Examiner*—Richard L. Raymond
*Attorney, Agent, or Firm*—F. A. Santoro

[57] ABSTRACT

Organophosphorus compounds, characterized by the following structural formula:

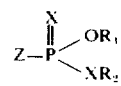

wherein Z is a $C_1$ to $C_6$ alkyl-O—$CH_2$ group; X is either O or S; $R_1$ is a $C_1$ to $C_6$ alkyl group; $R_2$ is one selected from the group consisting of $C_1$ to $C_{20}$ aliphatic, $C_6$ to $C_{10}$ aromatic and heterocyclic moiety containing 3 to 8 carbon atoms, have been shown to possess insecticidal properties.

7 Claims, No Drawings

ALKOXYALKYL PHOSPHONATES

This is a division of application Ser. No. 60,773, file Aug. 3, 1970, now U.S. Pat. No. 3,733,379.

This invention relates to novel organophosphorus compounds.

Under the prior art, many organophosphorus compounds are known to possess insecticidal activity.

For example, British Pat. No. 917,085 describes and claims a class of phosphorus compounds characterized by the following generic formula:

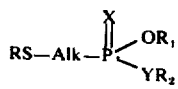

wherein Alk = $C_1$-$C_4$ alkylene; R and $R_1$ can be the same or different and each $C_1$-$C_4$ alkyl and $R_2$ is one selected from the group consisting of alkyl, phenylmercapto alkyl, alkylaminoalkyl, alkyl aminocarbonyl, optionally substituted phenyl, alkylmercapto or a coumaryl radical.

The disclosure in this patent is rather broad and relates to several $RSCH_2$ — analogs of the $ROCH_2$ compounds disclosed and claimed in the subject application. The subject British patent discusses very little relating to the insecticidal activity of the compounds disclosed therein and it provides toxicity data on only two compounds. The data in the British patent indicates that a high concentration of these compounds is required in order to kill mites and also these compounds possess a high toxicity.

Therefore, the compounds of the subject application are distinguished not only by its excellent insecticidal action, but also by its greatly reduced mammalian toxicity.

The organophosphorus compounds of the subject invention can be characterized by the following structural formula:

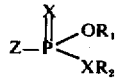

wherein Z is a $C_1$ to $C_6$ alkyl-O—$CH_2$ group; X is either O or S; $R_1$ is a $C_1$ to $C_6$ alkyl group; $R_2$ is one selected from the group consisting of $C_1$ to $C_{20}$ aliphatic, $C_6$ to $C_{10}$ aromatic and heterocyclic moiety containing 3 to 8 carbon atoms.

Specific examples of those compounds covered by the above generic formula are as follows:

| Compound No. | |
|---|---|
| 1 | O-methyl-S-(p-chlorophenyl)-methoxymethyl-phosphonodithioate |
| 2 | O-methyl-O-(1,2-dicarbethoxy)ethyl-methoxymethyl-phosphonothionate |
| 3 | O-methyl-O-2-pyrazinyl-methoxymethyl-phosphonothionate |
| 4 | O-methyl-S-(N-t. butylcarbamoylmethyl)-methoxy-methylphosphonodithioate |
| 5 | O-methyl-O-[4-(dimethyl-sulfamoyl) phenyl]-methoxymethylphosphonothionate |
| 6 | O-methyl-O-(4-cyanophenyl)-methoxymethylphosphonothionate |
| 7 | O-methyl-O-(4-nitrophenyl)-methoxymethylphosphonothionate |
| 8 | O-methyl-O-(2-chloro-4-nitro-phenyl)-methoxymethylphosphonothionate |

-continued

| Compound No. | |
|---|---|
| 9 | O-methyl-S-(1,2-dicarbethoxy)ethyl-methoxymethyl-phosphonodithioate |
| 10 | O-ethyl-methoxymethylphosphonothionate O,-O-diester with 4,4' thiodiphenol |
| 11 | O-ethyl-O-(4-nitrophenyl)-methoxymethylphosphonothionate |
| 12 | O-ethyl-O[4(dimethylsulfamoyl)-phenyl]-methoxymethylphosphonothionate |
| 13 | O-ethyl-S-[4 oxo-(1,2,3-benzotriazine-3(4H)yl)-methyl]methoxymethylphosphonodithioate |
| 14 | O-ethyl-S-(N-isopropylcarbamoylmethyl)-methoxymethylphosphonodithioate |
| 15 | O-ethyl-S-(N-methylcarbamoyloxymethyl)-methoxymethylphosphonodithioate |
| 16 | O-ethyl-O(2,3,5-trichloro-6-pyridyl)-methoxyphosphonothionate |
| 17 | O-ethyl-S-(4-nitrophenyl)-methoxymethylphosphonodithioate |
| 18 | O-ethyl-S-(1,2-dicarbomethoxy)ethyl-methoxymethylphosphonodithioate |
| 19 | O-ethyl-S-(1,2-dicarbethoxy)ethyl-methoxymethylphosphonodithioate |
| 20 | O,O'-diethyl-S,S'-methylene-bis(methoxymethylphosphonodithioate) |
| 21 | ethyl-(4-nitrophenyl)-methoxymethylphosphonate |
| 22 | ethyl-[4(N,N-dimethylsulfamoyl)phenyl]-methoxymethylphosphonate |
| 23 | ethyl-(4-cyanophenyl)-methoxymethylphosphonate |
| 24 | ethyl-(1,2-dicarbethoxy)-ethyl-methoxymethylphosphonate |
| 25 | O-ethyl-S-(1,2-dicarbethoxy)ethyl-methoxymethylphosphonothionate |
| 26 | O-ethyl-O-(4-nitrophenyl)-ethoxymethylphosphonothionate |
| 27 | O-ethyl-O-(4-cyanopehnyl)ethoxymethylphosphonothionate |
| 28 | O-ethyl-O-(3-methyl-4-methylthio)-phenyl-ethoxymethylphosphonothionate |
| 29 | ethyl-(4-nitrophenyl)-ethoxymethylphosphonate |
| 30 | ethyl-(4-cyanophenyl)-isopropoxymethylphosphonate |
| 31 | ethyl-(1,2-dicarbethoxy)ethyl-isopropoxymethylphosphonate |
| 32 | O-ethyl-S[(6-chloro-2-oxo-3-benzoxazolinyl)-methyl]isopropoxymethylphosphonothionate |
| 33 | O-ethyl-S(1,2-dicarbethoxy)ethyl-isopropoxymethylphosphonodithioate |
| 34 | O-ethyl-S-(methylthiomethyl)-isopropoxymethylphosphonodithioate |
| 35 | O-ethyl-S-(4-chlorophenylthio)methyliso-propoxymethylphosphonodithioate |
| 36 | O,O'-diethyl-S,S'-methylene-bis(isopropoxymethylphosphonodithioate) |
| 37 | O-ethyl-O-(2,3,5-trichloro-6-pyridyl)-isopropoxymethylphosphonothionate |
| 38 | O-ethyl-S-(4-cyanophenyl)-isopropoxymethylphosphonodithioate |
| 39 | O-ethyl-S-(4-chlorophenyl)-isopropoxymethylphosphonodithioate |
| 40 | O-ethyl-S-phenyl-isopropoxymethylphosphonodithioate |
| 41 | O-ethyl-S-(phtalimidomethyl)-isopropoxymethylphosphonodithioate |
| 42 | O-ethyl-S-[(6-chloro-2-oxo-3-benzoxazolinyl)-methyl]isopropoxymethylphosphonodithioate |
| 43 | O-ethyl-S-[4-oxo-1,2,3-benzotriazine-3(4H)-yl-methyl]-isopropoxymethylphosphonodithioate |
| 44 | O-ethyl-S-[(2-methoxy-5-oxo-$\Delta^2$-1,3,4-thiadiazolin-4-yl)methyl]methoxymethylphosphonodithioate |
| 45 | O-ethyl-S-(N-methylcarbamoylmethyl)-isopropoxymethylphosphonodithioate |
| 46 | O-ethyl-O-[(4-methylsulfonyl)-phenyl]-isopropoxymethylphosphonothionate |
| 47 | O-ethyl-O-[(N,N-dimethylsulfamoyl)phenyl]-isopropoxymethylphosphonothionate |
| 48 | O-ethyl-O-(4-cyanophenyl)-isopropoxymethylphosphonothionate |
| 49 | O-ethyl-O-[(4-N,N-dimethylcarbamoyl)-phenyl]-isopropoxymethylphosphonothionate |
| 50 | O-ethyl-O-(4-carbomethoxyphenyl)-isopropoxymethylphosphonothionate |
| 51 | O-ethyl-O-[(3-trifluoromethyl)-phenyl]-isopropoxymethylphosphonothionate |
| 52 | O-ethyl-O-(2,4,5-trichlorophenyl)-isopropoxymethylphosphonothionate |
| 53 | O-ethyl-O-(3-chlorophenyl)-isopropoxymethylphosphonothionate |
| 54 | O-ethyl-O[(3-methyl-4-methylthio)-phenyl]-isopropoxymethylphosphonothionate |
| 55 | O-ethyl-O-(4-nitrophenyl)-isopropoxymethyl- |

-continued

| Compound No. | |
|---|---|
| | phosphonothionate |
| 56 | O-ethyl-O-(3-methyl-4-nitrophenyl)-isopropoxymethylphosphonothionate |
| 57 | O-ethyl-S-(N-methylcarbamoyl)methyl-isopropoxymethylphosphonothiolate |
| 58 | O-ethyl-S-(N-isopropylcarbamoyl)methyl-isopropoxymethylphosphonodithioate |
| 59 | O-ethyl-S-(4-chlorophenylthiomethyl)-isopropoxymethylphosphonodithioate. |
| 60 | O-ethyl-O-(4-nitrophenyl)-isobutoxymethylphosphonothionate |
| 61 | O-ethyl-O-[(4-N,N-dimethylsulfamoyl)-phenyl]-isobutoxymethylphosphonothionate. |
| 62 | O-ethyl-O-(4-cyanophenyl) isobutoxymethylphosphonothionate. |
| 63 | O-ethyl-O-(3-methyl-4-nitrophenyl)-methoxymethylphosphonothionate. |
| 64 | O-ethyl-S-phenyl-methoxymethylphosphonodithioate. |
| 65 | O-ethyl-O-(2,4,5-trichlorophenyl)-methoxymethylphosphonothionate. |
| 66 | O-ethyl-O-[(3-methyl-4-methylthio) phenyl]-methoxymethylphosphonothionate. |
| 67 | O-ethyl-S-(4-chlorophenyl)-methoxymethylphosphonodithioate. |
| 68 | O-ethyl-S-(4-nitrophenyl)-methoxymethylphosphonothiolate. |
| 69 | O-ethyl-S-(4-methylphenyl)-methoxymethylphosphonodithioate. |
| 70 | O-ethyl-O-(2,4-dichlorophenyl)-methoxymethylphosphonothionate. |
| 71 | O-ethyl-S-(phtalimidomethyl)-methoxymethylphosphonodithioate |
| 72 | O-ethyl-O-(4-chlorophenyl)-methoxymethylphosphonothionate. |
| 73 | O-ethyl-O-(4-cyanophenyl)-methoxymethylphosphonothionate. |
| 74 | O-ethyl-O-(4-methyl-2-oxo-2H-1-benzopyran-7-yl)-methoxymethylphosphonothionate. |
| 75 | O-ethyl-S-(methylthiomethyl)-methoxymethylphosphonodithioate. |
| 76 | O,O'-diethyl-S,S'-(oxydimethylene)-bis-(methoxymethylphosphonodithioate). |
| 77 | O-ethyl-O-(2,4-dichlorophenoxymethyl)-methoxymethylphosphonothionate. |
| 78 | O-(4-nitrophenyl)-S-ethyl-methoxymethylphosphonodithioate. |
| 79 | O-[(4-N,N-dimethylsulfamoyl)-phenyl]-S-ethylmethoxymethylphosphonodithioate. |
| 80 | O-(4-cyanophenyl)-S-ethyl-methoxymethylphosphonodithioate. |

The synthesis of these compounds can be represented by the following schematic equations:

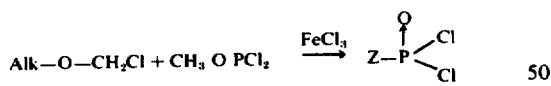

This reaction is described in Kwiatek et al U.S. Pat. No. 2,882,313 and in Chemical Abstracts 53, 16965 (1959).

Step 2:

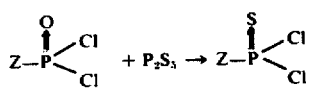

This reaction is described in the following article: E. Uhing et al, JACS, 83, 2299 (1961).

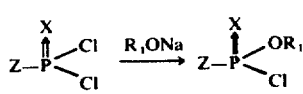

This reaction is carried out according to the methods and examples described by F. W. Hoffman et al [(JACS, 80 3945 (1958)] for phosphonate analogs of the subject intermediates. Therefore, the subject intermediates can be prepared according to these procedures described in this article and there is no need to go into any further detail at this time.

Another class of intermediates can be prepared according to the following schematic equation:

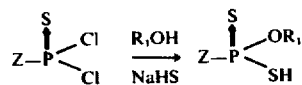

The preparation of these intermediates (O-alkylalkoxymethylphosphonodithioic acids) was carried out by using the method described by Szabo and Mann (JAFC, 17, 863 (1969).

A still further class of intermediates were prepared according to the following schematic equation:

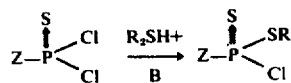

In this reaction from 1 to 2 moles of the reactant

(alkoxymethylphosphonodichloridothioate) preferably, at least 1.5 moles are used for each mole of R₂SH and Base. The temperature of the reaction is preferably maintained between −5° and 20°C. The mixture of R₂SH and Base is gradually added to the

in inert solvent such as chloroform, methylene chloride, benzene toluene, ether, and the like.

A still further class of intermediates can be prepared according to the following schematic reactions.

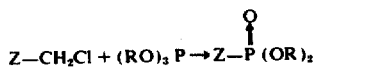

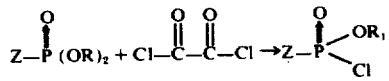

This reaction is described in an article entitled: Z. Pelchovica, Jr. Journal of the Chemical Society, 1961, 238.

Any of these intermediates can then be reacted with either a mercaptan or an alcohol in the presence of a base. The reaction is described for instance in the publication entitled: Houben-Weyl, "Methoden der Organischen Chemie" Parts 1 and 2, 1963; 1964.

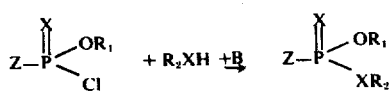

This reaction is also described in the above-identified reference.

An alternative way to the formation of the end products is to react the alkoxyphosphoric, thiophosphoric or dithiophosphoric acids with a suitable halide according to the following schematic equation.

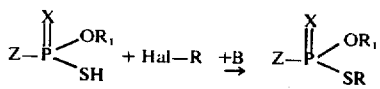

This reaction is also described in the above-identified reference.

The following examples are set forth in order to further set out the novel features of the subject invention.

EXAMPLE 1

Preparation of Ethyl Isopropoxymethylphosphonothiolothionic Acid

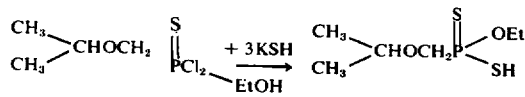

Isopropoxymethylphosphonothioic dichloride (35.2 g., 0.17 mole) was added dropwise during 30 minutes to a stirred solution of sodium hydrosulfide (0.51 mole) in ethanol (295 ml.) at −9° to −2° (dry ice-acetone cooling). The reaction mixture was evaporated at 50°/20 mm. for 20 minutes to yield a viscous opaque liquid. Water (130 ml.) was added to the liquid to yield a cloudy, yellow solution which was cooled to 10° by the addition of ice. Concentrated hydrochloric acid (20 ml.) was added to the stirred solution at 0°–10°. The resulting mixture was extracted with methylene chloride (3 × 200 ml.). The organic phase was dried with anhydrous magnesium sulfate, filtered, and the filtrate was evaporated at 40°/20 mm. to yield a yellow liquid, 34.6 g. The liquid was fractionated through a vigreux column (8 inches) to yield the product. The infrared spectrum of the product had peaks at 3100 $cm^{-1}$ (aliphatic C—H), 2550 $cm^{-1}$ (S—H), 1090 $cm^{-1}$ (C—O—C), and 1040 $cm^{-1}$, 960 $cm^{-1}$ (P—O—C).

The following O-alkyl-alkoxymethylphosphonothiolothionic acids were prepared in the same manner as described hereinabove.

TABLE I

O-ALKYL-ALKOXYMETHYLPHOSPHONOTHIOLOTHIONIC ACIDS

| Compound | b.p. | $h_D^{25}$ | $P^{31}$ n.m.r. | Anal. Calcd. | Anal. Found | Yield |
|---|---|---|---|---|---|---|
| O-ethyl-methoxymethylphosphonothiolothionic acid. | 72–77°/0.5mm | 1.5333 | −92.9 ppm | C, 25.8<br>H, 5.9<br>P, 16.6<br>S, 34.5 | C, 26.0<br>H, 5.9<br>P, 16.5<br>S, 34.4 | 77% |
| O-methyl-methoxymethylphosphonothiolothionic acid | 63–66°/0.3mm | 1.5489 | −96.2 ppm | C, 21.0<br>H, 5.3<br>P, 18.0<br>S, 37.3 | C, 20.9<br>H, 5.4<br>P, 18.3<br>S, 36.9 | 35% |
| O-ethyl-isopropoxymethylphosphonothiolothionic acid | 74–80°/0.1 mm | 1.5127 | −94.2 | C, 33.8<br>H, 7.1<br>P, 14.5<br>S, 30.1 | C, 33.6<br>H, 7.1<br>P, 14.7<br>S, 30.1 | 58% |

EXAMPLE 2

Preparation of Ethyl-Isopropoxymethylphosphonochloridothionate

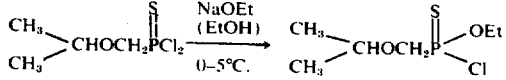

Sodium ethoxide (0.20 moles) in ethanol (100 ml.) was added dropwise during 1 hour and 10 minutes to a stirred solution of isopropoxymethylphosphonothioic dichloride (39.9 g., 0.19 moles) in benzene (200 ml.) at 2°–4° in a nitrogen atmosphere. The reaction mixture was warmed to 26° during ten minutes, washed with water (3 × 250 ml.), and dried over anhydrous magnesium sulfate. The mixture was filtered, and the filtrate was rotary evaporated at 45°/20 mm. to yield a colorless oil, 41g. The oil was distilled through a 12 inches vigreux to yield the product.

The gas chromatogram of the product (column, SE-30; Temp. 110°) had a peak at 3.6 min. (area, 95%) and peaks at 2.2 min. (area, 1%) and 5.0 min. (area, 4%). The infrared spectrum of the product had peaks 1100 $cm^{-1}$ (C—O—C), and 1040 $cm^{-1}$, 970 $cm^{-1}$ (P—O—C).

In like manner the following O-ethyl alkoxymethylphosphonochloridothioates were prepared.

TABLE II

O-ETHYL ALKOXYMETHYLPHOSPHONO CHLORIDOTHIOATES

| Compound | b.p. | $h_D^{25}$ | $P^{31}$ n.m.r. | Anal. Calcd. | Anal. Found | % Purity by G.C. | Yield(%) |
|---|---|---|---|---|---|---|---|
| O-ethylmethoxymethylphosphono chlorodithioates | 100.5–103.5/16mm | 1.4952 | −92.9 ppm | C, 25.5<br>H, 5.4<br>Cl, 18.8<br>P, 16.4<br>S, 17.0 | C, 25.7<br>H, 5.4<br>Cl, 18.8<br>P, 16.3<br>S, 17.3 | 98 | 79 |
| O-ethylisopropoxymethylphosphono chlorodithioates | 61–63°/0.1mm | 1.4825 | −93.4 ppm | C, 33.4<br>H, 6.5<br>Cl, 16.4<br>P, 14.3 | C, 33.6<br>H, 6.5<br>Cl, 16.3<br>P, 14.3 | 95 | 61 |

TABLE II-continued

O-ETHYL ALKOXYMETHYLPHOSPHONO CHLORIDOTHIOATES

| Compound | b.p. | $n_D^{25}$ | $P^{31}$ n.m.r. | Anal. Calcd. | Anal. Found | % Purity by G.C. | Yield(%) |
|---|---|---|---|---|---|---|---|
| O-ethylisobutoxymethylphosphono chlorodithioates | 54.5–57°/ 0.13mm | 1.4781 | −93.0 ppm | S, 14.8 Cl, 15.4 | S, 14.9 Cl, 15.3 | 95 | 65 |

EXAMPLE 3

Preparation of Isopropoxymethylphosphonothioic Dichloride

A stirred mixture of crude isopropoxymethylphosphonic dichloride (103.3 g., 0.54m), phosphorus pentasulfide ($P_4S_{10}$) (26.3 g., 0.05m.) and thiophosphoryl chloride (186 ml.) was heated under nitrogen during 5 hours to 110° by means of an oil bath. The mixture was heated at 110°–115° for 5 hours. The reaction mixture was cooled to room temperature, and was diluted with 2 × 300 ml. of n-hexane to yield an insoluble solid. The mixture was filtered and the solid was washed with hexane. The filtrate was washed quickly with water (350 ml.), dried over anhydrous magnesium sulfate, filtered, and rotary evaporated at 50°/20 mm. for 2 hours to yield a yellow liquid residue, 170g. The liquid was fractionated with a 12 inch vigreux column to yield the product. The gas chromatogram of the product (Column, SE-30; Temp. 85°,) had a peak at 3.8 min. (area, > 98%) followed by a shoulder (area < 2%) at 5.2 min. The infrared spectrum of the product had peaks at 2990 $cm^{-1}$ (aliphatic C—H) and 1090 $cm^{-1}$ (C—O—C).

In like manner, the following alkoxymethylphosphonothioic dichlorides were prepared.

TABLE III

ALKOXYMETHYLPHOSPHONOTHIOIC DICHLORIDES

| COMPOUND | b.p. | $n_D^{25}$ | $P^{31}$ n.m.r. ppm. | Anal. Calc'd. | Anal. Found | Yield |
|---|---|---|---|---|---|---|
| Methoxymethylphosphonothioic dichloride | 83–85°mm | 1.5408 | −81.9 | C, 13.4<br>H, 2.8<br>D, 39.5<br>P, 17.3<br>S, 17.9 | C, 13.4<br>H, 2.9<br>D, 39.3<br>P, 17.3<br>S, 18.3 | 44% |
| Ethoxymethylphosphonothioic dichloride | 88.5/90°/ 14mm | 1.5261 | −80.4 | S, 16.6 | S, 17.3 | 35% |
| Isopropoxymethylphosphonothioic dichloride | 87.5–94.5°/ 14mm | 1.5146 | −83.0 | C, 23.2<br>H, 4.4<br>D, 34.2<br>P, 15.0<br>S, 15.5 | C, 23.4<br>H, 4.5<br>D, 34.0<br>P, 15.0<br>S, 15.7 | 40% |
| Isobutoxymethylphosphonothioic dichloride | 44.5–47°/ 0.13mm. | 1.5084 | −81.5 | C, 27.2<br>H, 5.0<br>D, 32.2<br>S, 14.5 | C, 27.4<br>H, 4.9<br>D, 33.0<br>S, 15.0 | 33% |

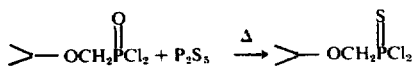

EXAMPLE 4

Preparation of Ethyl-Methoxymethylphosphonochloridothionate with N,N-Dimethyl-p-HydroxyBenzenesulfonamide

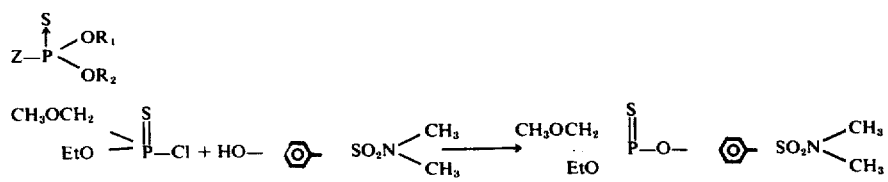

Ethyl-Methoxymethylphosphonochloridothionate (2.84 g., 15 mmoles) was added all at once to a solution of N,N-dimethyl-p-hydroxybenzenesulfonamide (3.01 g., 15 mmoles) and triethylamine (1.71 g., 17 mmoles) in acetone (30 ml.) A white solid started to separate after a few minutes. The reaction mixture was heated under reflux for 2 hours and 15 minutes. The mixture was cooled, and filtered to yield a white solid, triethylamine hydrochloride (1.73 g., 85% yield). The filtrate was evaporated at 40°/20 mm. to yield an amber oil. A benzene solution of the oil (50 ml.) was washed with water (50 ml.) and was dried over magnesium sulfate. The mixture was filtered and evaporated at 50°/20 mm and at 25°/0.1 mm to yield the product, a yellow oil, 4.8 g., 91% yield, ($n_D^{25}$ 1.5363) Anal. Calc'd for $C_{12}H_{20}NO_5PS_2$: C = 40.9; H = 5.8; N = 4.0: Found: C = 41.0; H = 6.1; N = 4.1. The infrared spectrum of the product had peaks of 1340 $cm^{-1}$ and 1150 $cm^{-1}$

EXAMPLE 5

Preparation of Ethyl-Methoxymethylphosphono chloridothionate with Dimethyl-Mercaptosuccinate

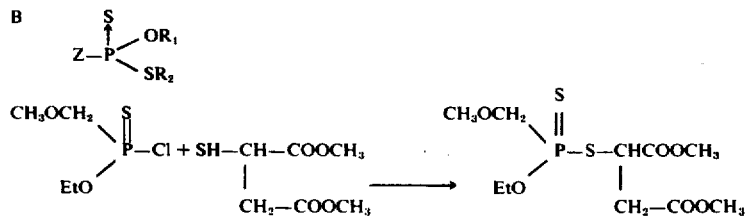

A solution of triethylamine (2.35 g., 23 mmoles) and dimethyl-mercaptosuccinate (3.78 g., 21 mmoles) in benzene (20 ml.) was added dropwise to a sirred solution of ethylmethoxymethylphosphonochloridothionate (4.02 g., 21 mmoles) in benzene. A white solid started separating immediately. The reaction mixture, was heated under reflux for 1 hour. The mixture was allowed to cool to room temperature and filtered to yield a solid, triethylamine hydrochloride (2.56 g., 86% yield). The filtrate was washed with water (100 ml.) and the organic phase was dried over magnesium sulfate. The mixture was filtered, and was evaporated at 50°/20 mm and then at 25°/0.1 mm to yield the product, a pale yellow oil, 6.1 g., 86% yield ($n_D^{17}$ 1.5111). The oil had one major peak (96% by area) in the gas chromatogram at 7.2 min. (T = 185°, 5% SE-30 on Chrom. W., 5 ft. Column, $N_2$ = 16 p.s.). Anal. Calc'd for $C_{10}H_{19}O_6PS_2$: C = 36.4; H = 5.8; P = 9.4; S = 19.4. Found: C = 36.4; H = 6.0; P = 9.7; S = 19.7. The infrared spectrum of the product had a peak at 1740 cm$^{-1}$ (C = O) and peaks at 1100 cm$^{-1}$ and 1020 cm$^{-1}$ (P — O — C). The product had one peak in the P$^{31}$ n.m.r. spectrum at −98.3 ppm ($H_3PO_4$).

EXAMPLE 6

Preparation of Ethyl Methoxymethylphosphonochloridate with p-Cyanophenol

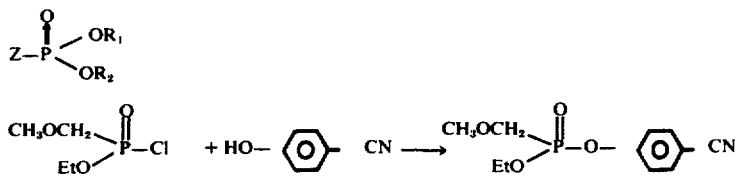

A solution of ethyl-methoxymethylphosphonochloridate (3.45 g., 20 mmoles) in acetone (10 ml) was added all at once to a solution of triethylamine (2.12 g., 21 mmoles) and p-cyanophenol (2.38 g., 20 mmoles) in acetone (20 ml.). There was an exothermic reaction and a white solid separated. The mixture was heated under reflux for one-half hour and then allowed to stand overnight at room temperature. The mixture was filtered to yield a solid, triethylamine hydrochloride, 2.44 g., 89% yield. The filtrate was added to water (100 ml.). Salt was added to the resulting mixture and the mixture extracted with dichloromethane (100 ml; 50 ml.). The organic phase was washed with 5% sodium carbonate solution (100 ml.) and water (3 × 100 ml.). The organic phase was dried (MgSO$_4$), filtered and evaporated at 50°/20 mm and then 50°/0.1 mm to yield the product a pale yellow liquid, 4.6 g., 90% yield, $n_D^{21}$ 1.5086. The product had one peak in the gas chromatogram at 2.8 min. (T = 185°, 5% SE-30 on Chromosorb W, 5 ft. column, $N_2$ = 16 p.s.i.).

The infrared spectrum of the product had a peak at 2280 cm$^{-1}$ (—CN) and peaks at 1120 cm$^{-1}$ and 1040 cm$^{-1}$ (P—O—C).

EXAMPLE 7

Preparation of Ethyl-Methoxymethylphosphonochloridate with Diethyl-Mercaptosuccinate

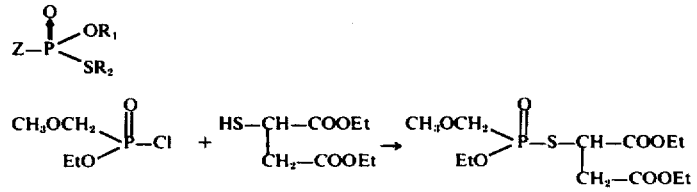

Ethyl-methoxymethylphosphonochloridate (3.45 g., 20 mmoles) in acetone (10 ml) was added all at once to a solution of triethylamine (212 g., 21 mmoles) and diethylmercaptosuccinate (4.12 g., 20 mmoles) in acetone (20 ml) immersed in a water bath. There was an immediate precipitate and an exothermic reaction. The mixture was heated under reflux for 20 minutes and then allowed to cool to room temperature. The mixture was filtered to yield a white solid, triethylamine hydrochloride, 2.56 g., 93% yield. The filtrate was poured into water (100 ml). This mixture was extracted with dichloromethane. The organic phase was washed with 5% sodium carbonate solution (100 ml) and water (200 ml). The organic phase was dried (Mg SO$_4$), filtered, and evaporated at 50°/20 mm and 55°/0.1 mm to yield the product, a yellow liquid, 5.4 g., 80% yield, $n_D^{21}$ 1.4716. On standing, the product became cloudy with a small amount of solid. The cloudy oil was filtered to yield a clear yellow liquid. The gas chromatogram of the liquid had one peak at 5.7 min. (T = 185°, 5% SE-30 on Chrom. W, 5ft. column, N$_2$ = 16 psi). The infrared spectrum of the liquid had a peak at 1740 cm$^{-1}$ (C = O) and peaks at 1120 cm$^{-1}$ and 1040 cm$^{-1}$ (P—O—C). The P$^{31}$ n.m.r. had a major peak (> 90%) at −45.9 ppm (H$_3$PO$_4$).

Other compounds of this invention were prepared by methods given in Examples 4 to 7. The structure of these compounds were confirmed by infrared and NMR spectroscopy. They were also characterized by refractive indicies which are listed in the following table:

TABLE IV $$ZOCH_2-\overset{\overset{X}{\|}}{P}\overset{YR_2}{\underset{OR_1}{\diagdown}}$$

| Compound No. | Z | R$_1$ | R$_2$ | X | Y | $N_D^{20}$ |
|---|---|---|---|---|---|---|
| 1. | Me | Me | —C$_6$H$_4$—Cl | S | S | 1.6170 |
| 2. | Me | Me | —CHCOOEt / CH$_2$COOEt | S | O | 1.4960 |
| 3. | Me | Me | pyrazine | S | O | 1.5357 |
| 4. | Me | Me | CH$_2$C(O)NH—t—Bu | S | S | 1.5337 |
| 5. | Me | Me | —C$_6$H$_4$—SO$_2$NMe$_2$ | S | O | 1.5455 |
| 6. | Me | Me | —C$_6$H$_4$—CN | S | O | 1.5515 |
| 7. | Me | Me | —C$_6$H$_4$—NO$_2$ | S | O | 1.5621 |
| 8. | Me | Me | —C$_6$H$_3$(Cl)—NO$_2$ | S | O | 1.5697 |
| 9. | Me | Me | —CH—COOEt / CH$_2$COOEt | S | S | 1.5073 |
| 10." | Me | Et | (C$_6$H$_4$)$_2$S | S | O | 1.5751 |
| 11. | Me | Et | —C$_6$H$_4$—NO$_2$ | S | O | 1.5537 |
| 12. | Me | Et | —C$_6$H$_4$—SO$_2$NMe$_2$ | S | O | 1.5383 |
| 13. | Me | Et | —CH$_2$—N(benzotriazinone) | S | S | 1.6176 |

TABLE IV-continued $$\text{ZOCH}_2-\overset{\overset{X}{\|}}{\underset{OR_1}{P}}\diagdown^{YR_2}$$

| Compound No. | Z | $R_1$ | $R_2$ | X | Y | $N_D^{20}$ |
|---|---|---|---|---|---|---|
| 14. | Me | Et | —CH$_2$—C(=O)NHiPr | S | S | 1.5373 |
| 15. | Me | Et | —CH$_2$C(=O)NHMe | S | S | 1.5492 |
| 16. | Me | Et | 3,5,6-trichloropyridin-2-yl | S | O | 1.5555 |
| 17. | Me | Et | —C$_6$H$_4$—NO$_2$ | S | S | 1.6054 |
| 18. | Me | Et | —CH(COOCH$_3$)CH$_2$COOCH$_3$ | S | S | 1.5099 |
| 19. | Me | Et | —CH(COOEt)CH$_2$—COOEt | S | S | 1.4978 |
| 20.[a] | Me | Et | —(CH$_2$)— | S | S | 1.5485 |
| 21. | Me | Et | —C$_6$H$_4$—NO$_2$ | O | O | 1.5208 |
| 22. | Me | Et | —C$_6$H$_4$—SO$_2$NMe$_2$ | O | O | 1.5130 |
| 23. | Me | Et | —C$_6$H$_4$—CN | O | O | 1.5090 |
| 24. | Me | Et | —CH(COOEt)CH$_2$—COOEt | O | O | 1.4402 |
| 25. | Me | Et | —CH(COOEt)CH$_2$—COOEt | O | S | 1.4720 |
| 26. | Et | Et | —C$_6$H$_4$—NO$_2$ | S | O | 1.5421 |
| 27. | Et | Et | —C$_6$H$_4$—CN | S | O | 1.5325 |
| 28. | Et | Et | —C$_6$H$_3$(CH$_3$)—SCH$_3$ | S | O | 1.5465 |
| 29. | Et | Et | —C$_6$H$_4$—NO$_2$ | O | O | 1.5173 |
| 30. | i-Pr | Et | —C$_6$H$_4$—CN | O | O | 1.5007 |
| 31. | i-Pr | Et | —CH(COOEt)CH$_2$COOEt | O | O | 1.4411 |
| 32. | i-Pr | Et | —CH$_2$—N(C(=O)O—C$_6$H$_4$Cl) | S | O | 1.5364 |

TABLE IV-continued $$ZOCH_2-\overset{X}{\underset{OR_1}{P}}\diagdown YR_2$$

| Compound No. | Z | $R_1$ | $R_2$ | X | Y | $N_D^{20}$ |
|---|---|---|---|---|---|---|
| 33. | i-Pr | Et | —CH(CH₂—COOEt)—COOEt | S | S | 1.4945 |
| 34. | i-Pr | Et | —CH₂—SCH₃ | S | S | 1.5317 |
| 35. | i-Pr | Et | —CH₂S—⟨phenyl⟩—Cl | S | S | 1.5858 |
| 36.ª | i-Pr | Et | —(CH₂)— | S | S | 1.5405 |
| 37. | i-Pr | Et | 2,3,5-trichloropyridinyl | S | O | 1.5401 |
| 38. | i-Pr | Et | —⟨phenyl⟩—CN | S | S | 1.5729 |
| 39. | i-Pr | Et | —⟨phenyl⟩—Cl | S | S | 1.5677 |
| 40. | i-Pr | Et | —⟨phenyl⟩ | S | S | 1.5568 |
| 41. | i-Pr | Et | —CH₂N(phthalimido) | S | S | 1.5801 |
| 42. | i-Pr | Et | —CH₂—N(chloro-benzdioxo) | S | S | 1.5764 |
| 43. | i-Pr | Et | —CH₂—N(phenyltetrazolyl) | S | S | 1.5971 |
| 44. | i-Pr | Et | —CH₂—N(methoxy-oxothiazolyl) | S | S | 1.5664 |
| 45. | i-Pr | Et | —CH₂—C(O)NHCH₃ | S | S | 1.5332 |
| 46. | i-Pr | Et | —⟨phenyl⟩—SO₂CH₃ | S | O | 1.5315 |
| 47. | i-Pr | Et | —⟨phenyl⟩—SO₂NMe₂ | S | O | 1.5298 |
| 48. | i-Pr | Et | —⟨phenyl⟩—CN | S | O | 1.5246 |

TABLE IV-continued $$ZOCH_2-\overset{X}{\underset{OR_1}{P}}\diagdown YR_2$$

| Compound No. | Z | $R_1$ | $R_2$ | X | Y | $N_D^{20}$ |
|---|---|---|---|---|---|---|
| 49. | i-Pr | Et | –C$_6$H$_4$–C(O)NMe$_2$ | S | O | 1.5294 |
| 50. | i-Pr | Et | –C$_6$H$_4$–C(O)OCH$_3$ | S | O | 1.5183 |
| 51. | i-Pr | Et | –C$_6$H$_4$–CF$_3$ | S | O | 1.4759 |
| 52. | i-Pr | Et | –C$_6$H$_2$Cl$_3$ (2,4,5-Cl) | S | O | 1.5407 |
| 53. | i-Pr | Et | –C$_6$H$_4$–Cl | S | O | 1.5176 |
| 54. | i-Pr | Et | –C$_6$H$_3$(CH$_3$)–SCH$_3$ | S | O | 1.5445 |
| 55. | i-Pr | Et | –C$_6$H$_4$–NO$_2$ | S | O | 1.5374 |
| 56. | i-Pr | Et | –C$_6$H$_3$(CH$_3$)–NO$_2$ | S | O | 1.5355 |
| 57. | i-Pr | Et | –CH$_2$C(O)NHCH$_3$ | O | S | 1.4873 |
| 58. | i-Pr | Et | –CH$_2$C(O)NH–i–Pr | S | S | 1.5199 |
| 59. | i-Pr | Et | –CH$_2$S–C$_6$H$_4$–Cl | S | S | 1.5858 |
| 60. | iBu | Et | –C$_6$H$_4$–NO$_2$ | S | O | 1.5314 |
| 61. | iBu | Et | –C$_6$H$_4$–SO$_2$NMe$_2$ | S | O | 1.5222 |
| 62. | iBu | Et | –C$_6$H$_4$–CN | S | O | 1.5216 |
| 63. | Me | Et | –C$_6$H$_3$(CH$_3$)–NO$_2$ | S | O | 1.5530 |

TABLE IV-continued
$$ZOCH_2-\overset{X}{\underset{OR_1}{P}}\diagdown\overset{YR_2}{}$$
| Compound No. | Z | R₁ | R₂ | X | Y | $N_D^{20}$ |
|---|---|---|---|---|---|---|
| 64. | Me | Et |  | S | S | 1.5839 |
| 65. | Me | Et | 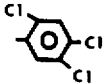 | S | O | 1.5559 |
| 66. | Me | Et | 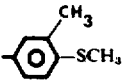 | S | O | 1.5636 |
| 67. | Me | Et |  | S | S | 1.5940 |
| 68. | Me | Et | 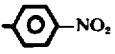 | S | O | 1.5523 |
| 69. | Me | Et | 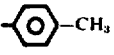 | S | S | 1.5827 |
| 70. | Me | Et |  | S | O | 1.5490 |
| 71. | Me | Et | 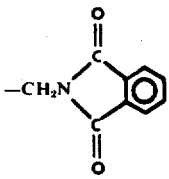 | S | S | 78°C. |
| 72. | Me | Et |  | S | O | 1.5333 |
| 73. | Me | Et |  | S | O | 1.5385 |
| 74. | Me | Et | 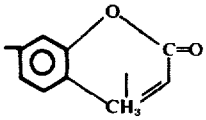 | S | O | 81°C. |
| 75. | Me | Et | —CH₂SCH₃ | S | S | 1.5592 |
| 76.ᵃ | Me | Et | —CH₂OCH₂— | S | S | 1.5614 |
| 77. | Me | Et | 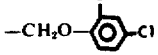 | S | O | 1.5850 |

TABLE IV-continued $$ZOCH_2-\overset{\overset{X}{\|}}{P}\overset{YR_2}{\underset{OR_1}{\diagdown}}$$

| Compound No. | Z | R$_1$ | R$_2$ | X | Y | N$_D^{20}$ |
|---|---|---|---|---|---|---|
| 78. | Me | –⟨O⟩–NO$_2$ | Et | S | S | 1.5996 |
| 79. | Me | –⟨O⟩–SO$_2$N(CH$_3$)$_2$ | Et | S | S | 1.5766 |
| 80. | Me | –⟨O⟩–CN | Et | S | S | 1.5890 |

The compounds of the invention have general insecticidal properties. Insecticidal compositions of the invention are prepared by admixing one or more of the active ingredients defined heretofore, in insecticidally effective amounts with a conditioning agent of the kind used and referred to in the art as a pest control adjuvant or modifier to provide formulations adapted for ready and efficient application to the soil using conventional applicator equipment.

Thus, the insecticidal compositions or formulations are prepared in the form of solids or liquids. Solid compositions are preferably in the form of granulars or dusts.

The compositions can be compounded to give homogeneous free-flowing dusts by admixing the active compound or compounds with finely divided solids preferably talc, natural clays, pyrophyllite, diatomaceous earth, or flours such as walnut shell, wheat, redwood, soya bean, and cottonseed flours. Other inert solid conditioning agents or carriers of the kind conventionally employed in preparing pest control compositions in powdered form can be used.

Granulars can be compounded by absorbing the compound in liquid form onto a preformed granular diluent. Such diluents as natural clays, pyrophyllite, diatomaceous earth, flours such as walnut shell, as well as granular sand can be employed.

In addition, granulars can also be compounded by admixing the active ingredient with one of the powdered diluents described hereinabove, followed by the step of either pelleting or extruding the mixture.

Liquid compositions of the invention are prepared in the usual way by admixing one or more of the active ingredients with a suitable liquid diluent medium. In the cases where the compounds are liquids, they may be sprayed in ultra low volume as such. With certain solvents, such as alkylated naphthalene or other aromatic petroleum solvents, dimethyl formamide, cycloketone, relatively high up to about 50% by weight or more concentration of the active ingredient can be obtained in solution.

The insecticidal compositions of the invention whether in the form of dusts or liquids, preferably also include a surface-active agent sometimes referred to in the art as a wetting, dispersing, or emulsifying agent. These agents, which will be referred to hereinafter more simply as surface-active dispersing agents, cause the compositions to be easily dispersed in water to give aqueous sprays which, for the most part, constitute a desirable composition for application.

The surface-active dispersing agents employed can be of the anionic, cationic, or nonionic type and include, for example, sodium and potassium oleate, the amine salts of oleic acid, such as morpholine and dimethylamine oleates, the sulfonated animal and vegetable oils, such as sulfonated fish and castor oils, sulfonated petroleum oils, sulfonated acyclic hydrocarbons, sodium salt of lignin sulfonic acid (goulac), alkylnaphthalene sodium sulfonate, sodium salts of sulfonated condensation products of naphthalene and formaldehyde, sodium lauryl sulfate, disodium monolauryl phosphate, sorbitol laurate, penaterythritol monostearate, glycerol monostearate, diglycol oleate, polyethylene oxides, ethylene oxide condensation products with stearyl alcohol and alkylphenol, polyvinyl alcohols, salts, such as the acetate of polyamines from reductive amination of ethylene/carbon monoxide polymers, laurylamine hydrochloride, lauryl-pyridinium bromide, stearyl trimethylammonium bromide, cetyl-dimethyl-benzyl ammonium chloride, lauryldimethylamine oxide, and the like. Generally, the surface-active agent will not comprise more than about 5 to 15% by weight of the composition, and in certain compositions the percentage will be 1% or less. Usually, the minimum lower concentration will be 0.1%.

The insecticidal compositions are applied either as a spray, granular or a dust to the locus or area to be protected from undesirable insects. Such application can be made directly upon the locus or area and the insects thereon during the period of infestation in order to destroy the insects, but preferably, the application is made in advance of an anticipated insect infestation to prevent such infestation. Thus, the compositions can be applied as aqueous foliar sprays but can also be applied as sprays directly to the surface of the soil. Alternatively, the dry powdered compositions can be dusted directly on the plants or on the soil.

The active compound is, of course, applied in an amount sufficient to exert the desired insecticidal action. The amount of the active compound present in the compositions as actually applied for destroying or preventing infestation by the insects will vary with the manner of application, the particular insect for which control is sought, the purpose for which the application is being made, and like variables. In general, the insecticidal compositions as applied in the form of a spray, dust or granular, will contain from about 0.1% to 100% by weight of the active compound.

The term "carrier" or "diluent" as used herein means a material, which can be inorganic or organic and synthetic or of natural origin, with which the active ingredient is mixed or formulated to facilitate its storage, transport, and handling and application to the plants to be treated. The carrier is preferably biologically and chemically inert and, as used, can be a solid or fluid. When solid carriers are used, they are preferably particulate, granular, or pelleted; however, other shapes and sizes of solid carrier can be employed as well. Such preferable solid carriers can be natural occurring minerals - although subsequently subjected to grinding, sieving, purification, and/or other treatments - including, for example, gypsum; tripolite; diatomaceous earth, mineral silicates such as mica, vermiculite, talc, and pyrophyllite; clays of the montmorillonite, kaolinite, or attapulgite groups; calcium or magnesium limes, or calcite and dolomite; etc. Carriers produced synthetically, as for example, synthetic hydrated silica oxides and synthetic calcium silicates can also be used, and many proprietary products of this type are available commercially. The carrier can also be an elemental substance such as sulfur or carbon, preferably an activated carbon. If the carrier possesses intrinsic catalytic activity such that it would decompose the active ingredient, it is advantageous to incorporate a stabilizing agent, as for example, polyglycols such as diethylene glycol, to neutralize this activity and thereby prevent possible decomposition of the present compounds.

For some purposes, a resinous or waxy carrier can be used, preferably one which is solvent soluble or thermoplastic, including fusible. Examples of such carriers are natural or synthetic resins such as a coumarone resin, rosin, copal, shellac, dammar, polyvinyl chloride, styrene polymers and copolymers, a solid grade of polychlorophenol such as is available under the registered trademark "Aroclor", a bitumen, an asphaltite, a wax for example, beeswax or a mineral wax such as paraffin wax or montan wax, or a chlorinated mineral wax, or a microcrystalline wax such as those available under the registered trademark "Mikrovan Wax." Compositions comprising such resinous or waxy carriers are preferably in granular or pelleted form.

Fluid carriers can be liquids, as for example, water, or an organic fluid, including a liquefied normally vaporous or gaseous material, or a vaporous or gaseous material, and can be solvents or nonsolvents for the active material. For example, the horticultural petroleum spray oils boiling in the range of from about 275° to about 575°F., or boiling in the range of about 575° to about 1,000°F. and having an unsulfonatable residue of at least about 75% and preferably of at least about 90%, or mixtures of these two types of oil, are particularly suitable liquid carriers.

The carrier can be mixed or formulated with the active material during its manufacture or at any stage subsequently. The carrier can be mixed or formulated with the active material in any proportion depending on the nature of the carrier. One or more carriers, moreover, can be used in combination.

The compositions of this invention can be concentrates, suitable for storage or transport and containing, for example, from about 5 to about 90% by weight of the active ingredient, preferably from about 20 to about 80 wt. %. These concentrates can be diluted with the same or different carrier to a concentration suitable for application. The compositions of this invention may also be dilute compositions suitable for application. In general, concentrations of about 0.1 to about 10% by weight, of active material based on the total weight of the compositions are satisfactory, although lower and higher concentrations can be applied if necessary.

The compositions of this invention can also be formulated as dusts. These comprise an intimate admixture of the active ingredient and a finely powdered solid carrier such as aforedescribed. The powdered carriers can be oil treated to improve adhesion to the surface to which they are applied. These dusts can be concentrates, in which case a highly sorptive carrier is preferably used. These require dilution with the same or a different finely powdered carrier, which can be of lower sorptive capacity, to a concentration suitable for application.

The compositions of the invention can be formulated as wettable powders comprising a major proportion of the active ingredient mixed with a dispersing, i.e., deflocculating or suspending agent, and if desired, a finely divided solid carrier and/or a wetting agent. The active ingredient can be in particulate form or adsorbed on the carrier and preferably constitutes at least about 10%, more preferably at least about 25% by weight of the composition. The concentration of the dispersing agent should in general be between about 0.5 and about 5% by weight of the total composition, although larger or smaller amounts can be used if desired.

The dispersing agent used in the composition of this invention can be any substance having definite dispersing, i.e., deflocculating or suspending, properties as distinct from wetting properties, although these substances can also possess wetting properties as well.

The dispersant or dispersing agent used can be protective colloids such as gelatin, glue, casein, gums, or a synthetic polymeric material such as polyvinyl alcohol and methyl cellulose. Preferably, however, the dispersants or dispersing agents used are sodium or calcium salts of high molecular weight sulfonic acids, as for example, the sodium or calcium salts of lignin sulfonic acids derived from sulfite cellulose waste liquors. The calcium or sodium salts of condensed aryl sulfonic acid, for example, the products known as "Tamol 731", are also suitable.

The wetting agents used can be nonionic type surfactants, as for example, the condensation products of fatty acids containing at least 12, preferably 16 to 20, carbon atoms in the molecule, or abietic acid or naphthenic acid obtained in the refining of petroleum lubricating oil fractions with alkylene oxides such as ethylene oxide or propylene oxide, or with both ethylene oxide and propylene oxide, as for example, the condensation product of oleic acid and ethylene oxide containing about 6 to 15 ethylene oxide units in the molecule. Other nonionic wetting agents like polyalkylene oxide polymers, commercially known as "Pluronics" can be used. Partial esters of the above acids with polyhydric alcohols such as glycerol, polyglycerol, sorbitol, or mannitol can also be used.

Suitable anionic wetting agents include the alkali metal salts, preferably sodium salts, of sulfuric acid esters or sulfonic acids containing at least 10 carbon atoms in a molecule, for example, the sodium secondary alkyl sulfates, dialkyl sodium sulfosuccinate available under the registered trademark "Teepol," sodium salts of sulfonated castor oil, sodium dodecyl benzene sulfonate.

Granulated or pelleted compositions comprising a suitable carrier having the active ingredient incorporated therein are also included in this invention. These can be prepared by impregnating a granular carrier with a solution of the inert ingredient or by granulating a mixture of a finely divided solid carrier and the active ingredient. The carrier used can consist of or contain a fertilizer or fertilizer mixture, as for example, a superphosphate.

The compositions of this invention can also be formulated as solutions of the active ingredient in an organic solvent or mixture of solvents, such as for example, alcohols; ketones, especially acetone; ethers, hydrocarbons, etc.

Where the toxicant itself is a liquid these materials can be sprayed on crops or insects without further dilution.

Petroleum hydrocarbon fractions used as solvents should preferably have a flash point above 73°F., an example of this being a refined aromatic extract of kerosene. Auxiliary solvents such as alcohols, ketones, and polyalkylene glycol ethers and esters can be used in conjunction with these petroleum solvents.

Compositions of the present invention can also be formulated as emulsifiable concentrates which are concentrated solutions or dispersion of the active ingredient in an organic liquid, preferably a water-insoluble organic liquid, containing an added emulsifying agent. These concentrates can also contain a proportion of water, for example, up to about 50% by volume, based onthe total composition, to facilitate subsequent dilution with water. Suitable organic liquids include, e.g., the above petroleum hydrocarbon fractions previously described. Higher concentrations may be prepared using polar cosolvents such as cyclohexanone or dimethylformamide.

The emulsifying agent can be of the type producing water-in-oil type emulsions which are suitable for application by low volume spraying or an emulsifier of the type producing oil-in-water emulsions can be used, producing concentrates which can be diluted with relatively large volumes of water for application by high volume spraying or relatively small volumes of water for low volume spraying. In such emulsions, the active ingredient is preferably in a nonaqueous phase.

The present invention is further illustrated in greater detail by the following examples, but it is to be understood that the present invention in its broadest aspects is not necessarily limited in terms of the reactants or specific temperatures, residence times, separation techniques and other process conditions, etc.; or dosage level, exposure times, test species used, etc. by which the compounds and/or compositions described and claimed are prepared and/or used.

In the examples which follow, the compounds were treated in the greenhouse and in the laboratory to determine their biological activity.

The experimental compounds were tested as aqueous emulsions. These emulsions were prepared by dissolving the compound in acetone and dispersing it in distilled water with Triton X-100, an alkylaryl polyether alcohol derived by the reaction of i-octyl phenol with ethylene oxide, to give spray emulsions containing the desired concentration of the compound. These emulsions were then used in standard laboratory tests described below.

Mexican Bean Beetle: Bean leaves were dipped in the emulsion of the test chemical and allowed to dry. The individual treated leaves were placed in Petri dishes and five Mexican bean beetle larvae introduced into each of the two replicate dishes.

Mites, Contact: Potted bean plants infested with the twospotted spider mites were placed on a turntable and sprayed with a formulation of the test chemical. The plants were held for seven days and the degree of mite control was rated after this period.

Mites, Systemic: Bean plants were treated by applying 20 ml. of the formulated test chemical to the soil. The mites were transferred to the plants after 24 hours. The plants were held for seven more days and the degree of mite control rated.

Aphid, Contact: Potted nasturtium plants infested with the bean aphids were placed on a turntable and sprayed with a formulation of the test chemical. The plants were held for 2 days and the degree of aphid control was rated.

Aphid, Systemic: Nasturtium plants were treated by applying 20 ml. of the formulated test chemical to the soil. The mites were transferred to the plants after 24 hours. The plants were held for 48 additional hours and the degree of the Aphid control rated.

Southern Army Worm: Bean leaves were dipped in the emulsion of the test chemical of desired concentration and allowed to dry. The individual treated leaves were placed in Petri dishes and five Southern Army Larvae introduced into each of the two replicate dishes. The plants were held for 2 days and the degree of control was rated.

Some of the compounds were also tested against other species of coleoptera family such as confused flour beetle and spider beetle, as well as adult Mexican bean beetles. They were also tested for their effectiveness to control German cockroaches and houseflies. Tests were also done to determine their ovicidal action. The compounds were found active in one or more of these tests.

Representative data for a number of compounds demonstrating their insecticidal activity are presented in Table V.

TABLE V

| No. | MBB | Mites | | Aphids | | SAW | HF |
|---|---|---|---|---|---|---|---|
|  |  | Contact | Systemic | Contact | Systemic |  |  |
| 1 | 8 | 0 | 0 | 0 | 3 | 10 | 7 |
| 2 | 0 | 0 | 0 | 0 | 0 | 0 | 1 |
| 3 | 10 | 10 | 0 | 10 | 5 | 0 | 1 |
| 4 | 2 | 10 | 1 | 10 | 10 | 0 | 0 |
| 5 | 10 | 4 | 0 | 10 | 0 | 8 | 10 |
| 6 | 10 | 8 | 0 | 10 | 1 | 0 | 10 |
| 7 | 10 | 10 | 0 | 10 | 0 | 2 | 10 |
| 8 | 0 | 10 | 0 | 10 | 2 | 0 | 5 |
| 9 | 4 | 0 | 0 | 10 | 3 | 2 | 1 |
| 10 | 0 | 0 | 0 | 0 | 2 | 2 | 10 |
| 11 | 10 | 10 | 6 | 10 | 1 | 10 | 10 |

TABLE V-continued

| No. | MBB | Mites Contact | Mites Systemic | Aphids Contact | Aphids Systemic | SAW | HF |
|---|---|---|---|---|---|---|---|
| 12 | 10 | 8 | 0 | 2 | 1 | 0 | 10 |
| 13 | 10 | 10 | 8 | 10 | 2 | 8 | 7 |
| 14 | 0 | 10 | 9 | 10 | 10 | 0 | 10 |
| 15 | 0 | 9 | 6 | 10 | 10 | 0 | 10 |
| 16 | 0 | 5 | 0 | 10 | 1 | 2 | 10 |
| 17 | 0 | 0 | 0 | 2 | 0 | 0 | 0 |
| 18 | 0 | 10 | 3 | 10 | 1 | 0 | 10 |
| 19 | 8 | 10 | 4 | 10 | 4 | 0 | 10 |
| 20 | 0 | 8 | 0 | 10 | 1 | 0 | 10 |
| 21 | 8 | 10 | 8 | 8 | 0 | 0 | 10 |
| 22 | 8 | 0 | 0 | 6 | 0 | 0 | 9 |
| 23 | 0 | 0 | 0 | 2 | 0 | 0 | 10 |
| 24 | 0 | 0 | 0 | 0 | 0 | 0 | 0 |
| 25 | 2 | 0 | 0 | 10 | 0 | 0 | 10 |
| 26 | 10 | 10 | 0 | 10 | 0 | 10 | 10 |
| 27 | 10 | 10 | 0 | 10 | 0 | 8 | 10 |
| 28 | 10 | 10 | 0 | 10 | 0 | 4 | 10 |
| 29 | 8 | 10 | 0 | 10 | 0 | 0 | 10 |
| 30 | 10 | 10 | 0 | 9 | 0 | 6 | 10 |
| 31 | 2 | 0 | 0 | 0 | 0 | 0 | 0 |
| 32 | 2 | 0 | 0 | 4 | 0 | 0 | 2 |
| 33 | 10 | 10 | 5 | 10 | 3 | 0 | 10 |
| 34 | 10 | 10 | 10 | 10 | 3 | 0 | 10 |
| 35 | 10 | 10 | 1 | 10 | 4 | 0 | 10 |
| 36 | 10 | 10 | 0 | 10 | 0 | 0 | 1 |
| 37 | 10 | 10 | 2 | 10 | 0 | 6 | 10 |
| 38 | 10 | 10 | 2 | 8 | 0 | 0 | 10 |
| 39 | 10 | 10 | 0 | 10 | 1 | 9 | 10 |
| 40 | 10 | 0 | 0 | 7 | 0 | 0 | 10 |
| 41 | 10 | 0 | 0 | 10 | 4 | 0 | 10 |
| 42 | 10 | 10 | 2 | 10 | 10 | 0 | 10 |
| 43 | 10 | 10 | 4 | 10 | 4 | 4 | 10 |
| 44 | 10 | 10 | 0 | 10 | 10 | 0 | 10 |
| 45 | 10 | 10 | 10 | 10 | 10 | 0 | 10 |
| 46 | 10 | 10 | 0 | 10 | 0 | 8 | 10 |
| 47 | 10 | 10 | 1 | 10 | 2 | 0 | 10 |
| 48 | 10 | 10 | 9 | 10 | 3 | 10 | 10 |
| 49 | 10 | 0 | 0 | 7 | 0 | 0 | 10 |
| 50 | 10 | 0 | 0 | 7 | 0 | 0 | 10 |
| 51 | 0 | 0 | 0 | 3 | 0 | 2 | 10 |
| 52 | 2 | 8 | 4 | 10 | 4 | 2 | 10 |
| 53 | 10 | 0 | 0 | 5 | 0 | 4 | 10 |
| 54 | 10 | 10 | 1 | 10 | 4 | 0 | 10 |
| 55 | 10 | 10 | 0 | 10 | 3 | 10 | 10 |
| 56 | 10 | 8 | 4 | 10 | 2 | 8 | 10 |
| 57 | 10 | 10 | 10 | 10 | 10 | 0 | 10 |
| 58 | 10 | 10 | 10 | 10 | 10 | 0 | 10 |
| 59 | 10 | 10 | 1 | 10 | 4 | 0 | 10 |
| 60 | 10 | 0 | 0 | 10 | 0 | 0 | 10 |
| 61 | 10 | 0 | 0 | 3 | 0 | 0 | 10 |
| 62 | 10 | 0 | 0 | 0 | 0 | 0 | 10 |
| 63 | 10 | 10 | 6 | 10 | 2 | 8 | 10 |
| 64 | 0 | 0 | 0 | 10 | 5.5 | 0 | 10 |
| 65 | 0 | 10 | 4 | 10 | 0 | 10 | 10 |
| 66 | 2 | 10 | 8 | 10 | 6 | 0 | 10 |
| 67 | 10 | 8 | 5 | 10 | 4 | 4 | 10 |
| 68 | 10 | 10 | 0 | 10 | 4 | 10 | 10 |
| 69 | 10 | 6 | 3 | 3 | 1 | 0 | 10 |
| 70 | 0 | 8 | 2 | 10 | 10 | 0 | 10 |
| 71 | 10 | 9 | 0 | 0 | 4 | 0 | 7 |
| 72 | 0 | 0 | 0 | 0 | 1 | 0 | 10 |
| 73 | 10 | 8 | 0 | 5 | 1 | 10 | 10 |
| 74 | 0 | 0 | 0 | 0 | 7 | 0 | 0 |
| 75 | 0 | 9 | 9 | 10 | 10 | 0 | 10 |
| 76 | 0 | 0 | 5 | 0 | 0 | 1 | 2 |
| 77 | 0 | 0 | 0 | 7 | 2 | 0 | 10 |
| 78 | 0 | 8 | 0 | 0 | 1 | 0 | 1 |
| 79 | 0 | 0 | 2 | 0 | 0 | 0 | 0 |
| 80 | 2 | 7 | 0 | 0 | 5 | 0 | 0 |

What is claimed is:

1. Compounds characterized by the following structure:

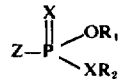

wherein Z is a $C_1$ to $C_6$ alkyl—O—$CH_2$ group; X is either O or S; $R_1$ is a $C_1$ to $C_6$ alkyl group; $R_2$ is a (1,2-dicarbethoxy) ethyl group.

2. A compound according to claim 1, O-methyl-O-(1,2-dicarbethoxy) ethyl-methoxymethylphosphonothionate.

3. A compound according to claim 1, O-methyl-S-(1,2-dicarbethoxy)ethyl-methoxymethylphosphonodithioate.

4. A compound according to claim 1, O-ethyl-S-(1,2-dicarbonethoxy) ethyl-methoxymethyl-phosphonodithioate.

5. A compound according to claim 1, O-ethyl-S-(1,2-dicarbethoxy) ethyl-methoxymethylphosphonodithioate.

6. A compound according to claim 1, O-ethyl-S-(1,2-dicarbethoxy) ethyl-methoxymethyl-phosphonothionate.

7. A compound according to claim 1, O-ethyl-S-(1,2-dicarbethoxy) ethyl-isopropoxymethyl-phosphonodithioate.

* * * * *